United States Patent
Koyama et al.

(10) Patent No.: US 6,780,817 B1
(45) Date of Patent: Aug. 24, 2004

(54) CATALYST FOR HYDROFINING AND METHOD FOR PREPARATION THEREOF

(75) Inventors: Hiroki Koyama, Toda (JP); Toru Saito, Toda (JP); Hideaki Kumagai, Toda (JP)

(73) Assignee: Japan Energy Corporation, Tokyo (JP)

( * ) Notice: Subject to any disclaimer, the term of this patent is extended or adjusted under 35 U.S.C. 154(b) by 0 days.

(21) Appl. No.: 09/601,788

(22) PCT Filed: Dec. 2, 1999

(86) PCT No.: PCT/JP99/06760

§ 371 (c)(1),
(2), (4) Date: Aug. 8, 2000

(87) PCT Pub. No.: WO00/33957

PCT Pub. Date: Jun. 15, 2000

(30) Foreign Application Priority Data

Dec. 8, 1998 (JP) .......................................... 10/348402

(51) Int. Cl.⁷ .................... B01J 27/19; B01J 27/185; B01J 23/00; B01J 23/40; B01J 23/56

(52) U.S. Cl. .................... 502/314; 502/208; 502/211; 502/213; 502/315; 502/322; 502/327; 502/332; 502/335; 502/337; 502/355; 502/415; 502/439

(58) Field of Search ................ 502/314, 321, 502/322, 208, 327, 332, 355, 415, 439, 315, 335, 337, 211, 213; 501/153; 264/464

(56) References Cited

U.S. PATENT DOCUMENTS

| | | | | |
|---|---|---|---|---|
| 3,617,522 A | * | 11/1971 | Schrepfer | ................... 208/139 |
| 3,994,832 A | * | 11/1976 | Antos | .......................... 252/464 |
| 3,998,722 A | * | 12/1976 | Mayer et al. | ............... 208/112 |
| 4,048,060 A | * | 9/1977 | Riley | .......................... 208/210 |
| 4,066,572 A | * | 1/1978 | Choca | ......................... 252/437 |
| 4,079,097 A | * | 3/1978 | Antos | ....................... 260/683.3 |
| 4,080,313 A | | 3/1978 | Whittam | |
| 4,200,552 A | * | 4/1980 | Noguchi et al. | ........ 252/466 PT |
| 4,212,769 A | * | 7/1980 | Antos | .......................... 252/441 |
| 4,367,165 A | | 1/1983 | Asaoka et al. | |
| 4,460,707 A | * | 7/1984 | Simpson | ..................... 502/315 |
| 4,562,059 A | * | 12/1985 | Asaoka et al. | .............. 423/626 |
| 4,595,667 A | * | 6/1986 | Takase et al. | ................. 502/63 |
| 4,837,193 A | | 6/1989 | Akizuki et al. | |

(List continued on next page.)

FOREIGN PATENT DOCUMENTS

| | | | |
|---|---|---|---|
| EP | WO 93/05878 | * | 4/1993 |
| EP | A2875287 | | 11/1998 |
| JP | 5282690 | | 7/1977 |
| JP | A688081 | | 3/1984 |
| JP | B2-6049135 | | 10/1985 |
| JP | A6127931 | | 5/1994 |
| JP | A9248460 | | 9/1997 |
| JP | A10296091 | | 11/1998 |

*Primary Examiner*—Cam N. Nguyen
(74) *Attorney, Agent, or Firm*—Birch, Stewart, Kolasch & Birch, LLP

(57) ABSTRACT

A hydrorefining catalyst of a hydrogenation active metal component supported on a refractory porous carrier has a median pore diameter determined by the nitrogen adsorption method of 8 to 20 nm, a pore volume determined by the nitrogen adsorption method of 0.56 cm$^3$/g or greater, and a pore volume of pores with a pore diameter of 50 nm or larger determined by the mercury intrusion porosimetry method of 0.32 cm$^3$/g or greater. Both the demetallizing activity and metal deposition capacity of the catalyst in hydrogenation and demetallizing of heavy oil are high. The hydrorefining catalyst is obtained by kneading a porous starting powder principally composed of γ-alumina and having a pore capacity of 0.75 m$^3$/g or larger and a mean pore diameter of 10 to 200 μm, molding and calcining, and supporting an active metal component on the product.

13 Claims, 4 Drawing Sheets

Aging tests with Ratawi AR & VR mixture

U.S. PATENT DOCUMENTS

| | | | | |
|---|---|---|---|---|
| 4,879,265 A | * | 11/1989 | Simpson et al. | 502/211 |
| 4,888,104 A | | 12/1989 | Ramirez de Aqudelo et al. | |
| 4,988,659 A | | 1/1991 | Pecoraro | |
| 5,047,142 A | * | 9/1991 | Sherwood, Jr. et al. | 208/251 H |
| 5,094,994 A | * | 3/1992 | Sherwood, Jr. et al. | 502/314 |
| 5,215,955 A | * | 6/1993 | Threlkel | 502/221 |
| 5,223,472 A | * | 6/1993 | Simpson et al. | 502/314 |
| 5,246,569 A | * | 9/1993 | Heinerman et al. | 208/216 R |
| 5,300,217 A | * | 4/1994 | Simpson et al. | 206/216 PP |
| 5,403,806 A | * | 4/1995 | Simpson | 502/211 |
| 5,514,273 A | * | 5/1996 | Sherwood, Jr. et al. | 208/216 PP |
| 5,820,749 A | * | 10/1998 | Haluska et al. | 208/216 PP |
| 5,827,421 A | * | 10/1998 | Sherwood, Jr. | 208/112 |
| 5,906,731 A | * | 5/1999 | Abdo et al. | 208/216 R |
| 5,928,499 A | * | 7/1999 | Sherwood, Jr. et al. | 208/216 PP |
| 5,968,348 A | * | 10/1999 | Sherwood, Jr. | 208/216 PP |

* cited by examiner

Fig. 1

Table 1-A

| | Example | | | | | | | | | | Comparative Example | | | | | | | | |
|---|---|---|---|---|---|---|---|---|---|---|---|---|---|---|---|---|---|---|---|
| Example No. | | 1 | 2 | 3 | 4 | 5 | 6 | 7 | 8 | 9 | 1 | 2 | 3 | 4 | 5 | 6 | 7 | 8 | 9 |
| Catalyst No. | | 3056 | 3066 | 3070 | 3057 | 3058 | 3009 | 3032 | 3076 | 3087 | 3043 | 3010 | 3093 | 3041 | 3021 | 3023 | 3025 | HOP 606 | 3069 |
| Shape | | C* | C* | C* | C* | C* | C* | C* | C* | 4L* | C* | C* | C* | C* | C* | C* | C* | C* | C* |
| Diameter (mm) | | 1.5 | 1.5 | 1.5 | 1.5 | 1.5 | 1.5 | 1.5 | 1.2 | 1.6 | 1.5 | 1.5 | 1.5 | 1.5 | 1.5 | 1.5 | 1.5 | 1.6 | 1.5 |
| Molybdenum (wt%) | | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 6.0 | 3.0 | 3.0 |
| Nickel (wt%) | | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.5 | 1.0 | 1.0 |
| Phosphorus (wt%) | | 0 | 0.6 | 0 | 0 | 0 | 0 | 1.0 | 0.6 | 0.6 | 0 | 0 | 0.6 | 0 | 0 | 0 | 0 | 0 | 0.6 |
| Boron (wt%) | | 0 | 0 | 1.0 | 0 | 0 | 0 | 0 | 0 | 0 | 0 | 0 | 0 | 0 | 0 | 0 | 0 | 0 | 0 |
| Starting γ-alumina/ carrier (wt%) | | 100 | 100 | 100 | 100 | 100 | 80 | 100 | 100 | 100 | 100 | 60 | 100 | 100 | 100 | 100 | 100 | — | 100 |
| Specific surface area [NM*] (m²/g) | | 202 | 187 | 191 | 276 | 213 | 258 | 210 | 189 | 186 | 272 | 256 | 183 | 289 | 293 | 275 | 249 | 252 | 176 |
| Pore volume [NM*] (cm³/g) | | 0.63 | 0.69 | 0.59 | 0.71 | 0.68 | 0.62 | 0.62 | 0.73 | 0.71 | 0.54 | 0.65 | 0.69 | 0.67 | 0.71 | 0.65 | 0.66 | 0.73 | 0.60 |
| Median pore diameter [NM*] (nm) | | 11.1 | 13.0 | 11.0 | 8.2 | 10.3 | 8.2 | 9.4 | 12.7 | 12.4 | 6.8 | 8.6 | 12.2 | 7.5 | 7.9 | 8.0 | 8.9 | 9 | 12.6 |

C*: Cylindrical   4L*: 4 Lobes   NM*: Nitrogen adsorption method

Fig. 2
Table 1-B

| | Example | | | | | | | | | | Comparative Example | | | | | | | | |
|---|---|---|---|---|---|---|---|---|---|---|---|---|---|---|---|---|---|---|---|
| Example No. | 1 | 2 | 3 | 4 | 5 | 6 | 7 | 8 | 9 | | 1 | 2 | 3 | 4 | 5 | 6 | 7 | 8 | 9 |
| Catalyst No. | 3056 | 3066 | 3070 | 3057 | 3058 | 3009 | 3032 | 3076 | 3087 | | 3043 | 3010 | 3093 | 3041 | 3021 | 3023 | 3025 | HOP 606 | 3069 |
| Pore volume [MM*] (cm³/g) | 0.95 | 1.00 | 0.89 | 0.94 | 0.97 | 0.94 | 0.88 | 1.03 | 0.97 | | 0.83 | 0.86 | 0.90 | 1.00 | 0.84 | 0.83 | 0.79 | 0.97 | 0.91 |
| Pore volume of 50nm or larger [MM*] (cm³/g) | 0.38 | 0.35 | 0.34 | 0.34 | 0.34 | 0.34 | 0.33 | 0.34 | 0.34 | | 0.33 | 0.28 | 0.29 | 0.42 | 0.21 | 0.17 | 0.20 | 0.31 | 0.36 |
| Pore volume of 1,000nm or larger [MM*] (cm³/g) | 0.01 | 0.02 | 0.01 | 0.02 | 0.02 | 0.16 | 0.15 | 0.02 | 0.02 | | 0.08 | 0.13 | 0.01 | 0.24 | 0.01 | 0.01 | 0.00 | 0.06 | 0.11 |
| Bulk density (cm³/g) | 0.46 | 0.47 | 0.50 | 0.49 | 0.46 | 0.49 | 0.52 | 0.46 | 0.43 | | 0.53 | 0.50 | 0.48 | 0.45 | 0.51 | 0.56 | 0.54 | 0.46 | 0.51 |
| Molding method | S | P | S | S | S | S | S | P | P | | S | S | P | S | P | S | P | — | P |
| Wear rate(%) | — | 0.36 | — | — | — | — | — | — | — | | — | — | 0.14 | — | — | — | — | — | 3.7 |
| Wear evaluation | — | ○ | — | — | — | — | — | — | — | | — | — | ○ | — | — | — | — | — | × |
| Initial demetallizing activity | 0.98 | 1.22 | 1.30 | 1.01 | 1.06 | 0.97 | 1.19 | 1.63 | 1.09 | | 0.82 | 0.91 | 1.04 | 0.91 | 0.88 | 0.76 | 1.06 | 0.86 | — |
| Evaluation (initial activity) | ○ | ○ | ○ | ○ | ○ | ○ | ○ | ○ | ○ | | × | × | ○ | × | × | × | ○ | × | — |
| Effective amount of metal deposition (g/100g-fresh catalyst) | — | 92 | — | — | — | 100 | 87 | 96 | 127 | | — | — | 68 | — | — | — | 57 | 64 | — |
| Evaluation (life) | — | ○ | — | — | — | ○ | ○ | ○ | ○ | | — | — | × | — | — | — | × | × | — |
| Overall evaluation | ○ | ○ | ○ | ○ | ○ | ○ | ○ | ○ | ○ | | × | × | × | × | × | × | × | × | — |

MM*: Mercury intrusion porosimetry method

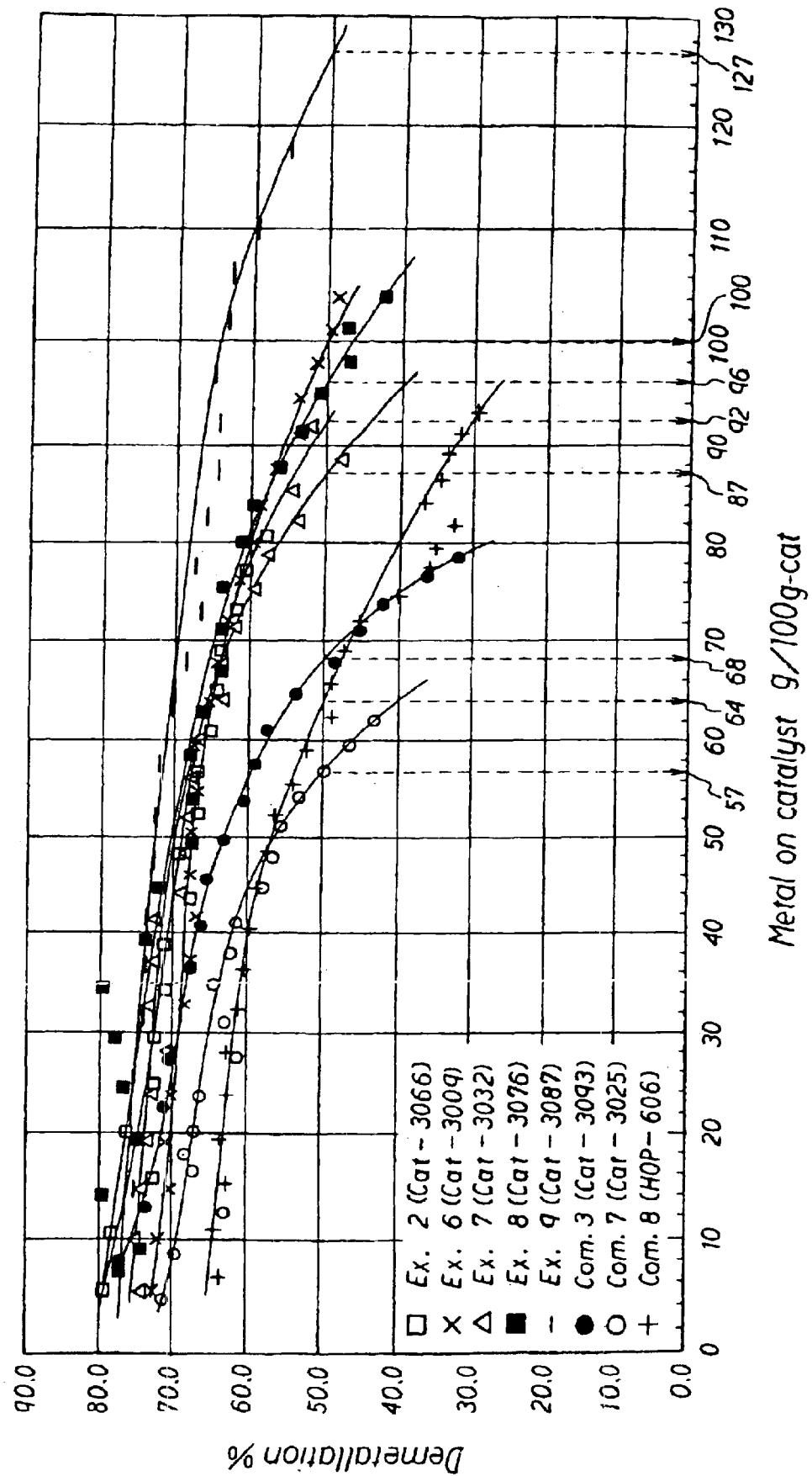

CATALYST FOR HYDROFINING AND METHOD FOR PREPARATION THEREOF

This application is the national phase under 35 U.S.C. § 371 of PCT International Application No. PCT/JP99/06760 which has an International filing date of Dec. 2, 1999, which designated the United States of America.

TECHNICAL FIELD

The present invention relates to a catalyst used in hydrorefining of hydrocarbons, such as petroleum fractions, and a method of producing the same, and particularly relates to a catalyst used in hydrodemetallization of heavy fractions and residue of various types that are obtained by normal-pressure distillation or reduced-pressure distillation of heavy oils, such as crude oil, tar sand, shale oil, coal liquefaction oil.

BACKGROUND ART

Heavy oil, such as residue from normal-pressure distillation or reduced-pressure distillation residue, comprises a high metal content of nickel, vanadium, etc. This metal content poisons hydrorefining catalysts for desulfurization, denitrification, cracking, etc., and reduces their catalytic activity and, therefore, is pre-treated with hydrorefining catalysts for the purpose of demetallization (also referred to hereafter as demetallizing catalysts).

It is known that although these demetallizing catalysts have the same median pore diameter and support the same active metal species, there are considerable differences in their demetallizing activity and metal deposition capacity (amount of metal that can deposit inside the pores until the catalyst loses activity). This appears to be due to the fact that there are differences in pore diameter distribution and catalyst structure in other ways. For example, when a catalyst having a pore volume almost all of which is pores with a pore diameter of 60 nm or smaller is used as a demetallizing catalyst, demetallizing activity is high, but large amounts of metal deposit around the pore inlets and metal deposition capacity is reduced because the pore inlets are clogged. In contrast to this, when a catalyst (bimodal catalyst) having a pore group with a pore diameter of 60 nm or smaller (mesopores) and a pore group whose pore diameter exceeds 60 nm (macropores) is used, metal deposition capacity can be increased, but there is a relative drop in demetallizing activity.

Japanese Patent Publication No. 60-49135 (Rhône-Poulenc Industries) and Japanese Patent Application Laid-Open No. 6-88081 (Texaco Development Corporation) are known as conventional bimodal catalysts of this type. Nevertheless, in reference to the present invention, although the former discloses a spherical carrier, there is no mention whatsoever of the catalyst being used for a demetallization reaction. The latter reference tells of a carrier with a total pore volume of 0.5 to 0.8 cm$^3$/g, but metal deposition capacity of this catalyst is not high.

That is, a hydrorefining catalyst with both a high demetallizing activity and a high metal deposition capacity has not existed in the past.

DISCLOSURE OF THE INVENTION

An object of the present invention is to present a hydrorefining catalyst with both high demetallizing activity and high metal deposition capacity, and a method of producing the same.

In accordance with the first aspect of the present invention, a hydrorefining catalyst is provided comprising a hydrogenation active metal component supported on a refractory porous carrier, wherein median pore diameter determined by the nitrogen adsorption method is 8 to 20 nm, pore volume determined by a nitrogen adsorption method is 0.56 cm$^3$/g or greater, and pore volume of pores with a pore diameter of 50 nm or larger determined by a mercury intrusion porosimetry method is 0.32 cm$^3$/g or greater.

Both the demetallizing activity and metal deposition capacity of the hydrorefining catalyst of the present invention for hydrorefining, particularly hydrodemetallization, can be increased by bringing the median pore diameter, pore volume of pores (pores having a pore diameter of approximately 60 nm or smaller) determined by the nitrogen adsorption method, and pore volume of pores that were determined by the mercury intrusion porosimetry method and that have a pore diameter exceeding 50 nm to values within the above-mentioned prescribed ranges. As a result, long-term retention of a high metal content removal percentage is possible. For instance, it was clarified that the hydrorefining catalyst of the present invention has a high effective amount of metal deposition of 70 g or more per 100 g fresh catalyst under conditions defined later. The catalyst of the present invention is particularly suitable for demetallizing or deasphaltening of heavy oil.

It is preferred that the hydrorefining catalyst of the present invention have a pore volume determined by the mercury intrusion porosimetry method of 0.87 cm$^3$/g or greater so that it will have even better demetallizing activity. Moreover, in order to obtain sufficient mechanical strength, the hydrorefining catalyst should have a pore volume of pores of 0.2 cm$^3$/g or greater which is determined by the mercury intrusion porosimetry method and having a pore diameter of 1,000 nm or larger. In addition, bulk density can be brought to 0.52 cm$^3$/g or less because the catalyst of the present invention has high demetallizing activity. As a result, it is possible to reduce the load on the reaction vessel in which the catalyst has been packed and the durability of the reaction vessel can therefore be improved, even if differential pressure is somewhat high.

The hydrorefining catalyst of the present invention may comprise 2 to 6 wt % molybdenum and 0.5 to 2 wt % nickel or cobalt, as hydrogenation active metal components. The hydrorefining catalyst of the present invention may further comprise 0.5 to 1.5 wt % phosphorus or boron.

In accordance with a second aspect of the present invention, a method of producing a hydrorefining catalyst is provided comprising the steps of kneading a porous starting powder whose main component is γ-alumina and which has a pore volume of 0.75 cm$^3$ g/or greater and an mean particle diameter of 10 to 200 μm to prepare a kneaded product; molding and calcining said kneaded product; and supporting active metal component on the kneaded product or on the kneaded product after calcining. With the method of the present invention, since a porous powder that comprises γ-alumina powder as its main component and has the above-mentioned prescribed pore volume and mean particle diameter is used as the starting material, it is possible to easily produce at a low cost a hydrorefining catalyst with both a high demetallizing activity and a high metal deposition capacity and a catalyst carrier used by the same.

In this text, the term "γ-alumina as the main component" means that 70 wt % or more of the starting powder is γ-alumina. The remainder may be, for instance, boehmite, such as pseudoboehmite, etc. In order to improve the demetallizing activity and metal deposition capacity of the catalyst even further, it is preferred that 90 wt % or more, particularly 95 wt % or more, of the starting powder be γ-alumina. It is further preferred that approximately 100% of the starting powder be γ-alumina powder. The term "γ-alumina" in the present text means transition alumina with peaks at 2θ=46° and 67° in X-ray diffraction at a wavelength of 0.154 nm. Preferably, γ-alumina is prepared by calcining boehmite powder. The boehmite powder in the present specification means a boehmite or pseudoboehmite powder. Furthermore, pseudoboehmite is an α-alumina hydrate with excess water molecules in the crystals and is represented by $Al_2O_3 \cdot XH_2O$, with X being 1 or more and less than 2.

In terms of molding cost and the high percentage of void of the catalyst carrier, it is preferred that molding be performed by, for instance, extrusion molding using a molding device in the method of producing a hydrorefining catalyst of the present invention.

BRIEF DESCRIPTION OF THE DRAWINGS

FIG. 1 is a table showing the properties of catalysts that were made in the examples and comparative examples (Table 1-A).

FIG. 2 is a table showing the properties of catalysts that were made in the examples and comparative examples (Table 1-B).

FIG. 3 is a graph showing changes in the demetallizing rate with an increase in the amount of metal deposition of catalysts that were prepared in the examples and comparative examples.

BEST MODE FOR CARRYING OUT THE INVENTION

Figure 4:
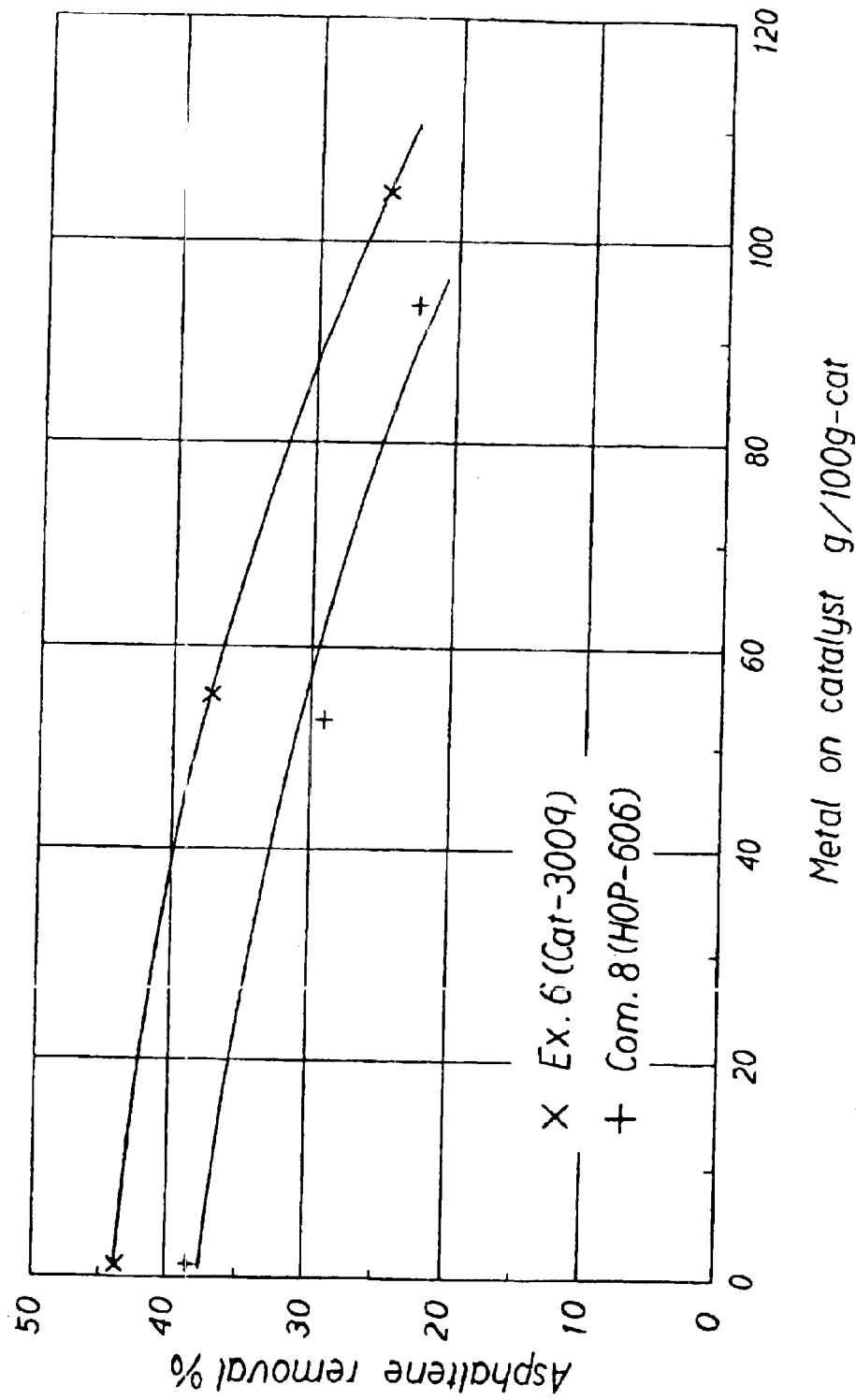
FIG. 4 is a graph showing changes in the deasphaltening rate with an increase in the amount of metal deposition of catalysts that were prepared in the examples and comparative examples.

The hydrorefining catalyst and method of producing the same will now be exemplified below:

i) Median Pore Diameter, Pore Volume and Specific Surface Area of the Catalyst

The median pore diameter of the hydrorefining catalyst of the present invention with pores having a pore diameter determined by the nitrogen adsorption method of 1.8 to 60 nm for instance, is 8 nm or larger, 8 to 20 nm for instance, preferably 8 to 15 nm, particularly preferably 8 to 13 nm. Pore volume of the hydrorefining catalyst of the present invention with pores having a pore diameter determined by the nitrogen adsorption method of 1.8 to 60 nm, for instance, is 0.56 $cm^3/g$ or greater, preferably 0.56 to 1.0 $cm^3/g$, particularly preferably 0.56 to 0.8 $cm^3/g$, and even more preferably, 0.62 to 0.8 $cm^3/g$. The specific surface area of the catalyst of the present invention is 150 $m^2/g$ or greater, preferably 170 to 300 $m^2/g$, particularly 180 to 280 $m^2/g$. The above-mentioned median pore diameter, pore volume and specific surface area are determined by the nitrogen adsorption method. Median pore diameter can be determined by a method wherein: nitrogen gas absorbed during nitrogen gas desorption under conditions of a relative pressure of 0.967 is converted into a volume of liquid, which is treated as pore volume (V); and from the correlation between the pore volume and pore diameter calculated by the BJH method, a pore diameter with which cumulative pore volume cumulated from the larger pore diameters reaches a half (2/V) of the pore volume (V) is determined as the median pore diameter is. The pore distribution of a pore diameter of approximately 2 to 60 nm can be determined by the nitrogen adsorption method. The BJH method is disclosed in the Journal of the American Chemical Society, vol. 73, p. 373~ (1951).

The pore volume of pores determined by the mercury intrusion porosimetry method of the hydrorefining catalyst of the present invention is 0.87 $cm^3/g$ or higher, preferably 0.87 to $cm^3/g$, particularly 0.88 to 1.05 $cm^3/g$. Moreover, of the pores determined by the mercury intrusion porosimetry method, the pore volume of pores with a pore diameter of 1,000 nm or larger is preferably 0.2 $cm^3/g$ or less. Determination by the mercury intrusion porosimetry method was performed within a range of 2 to 4,225 $kg/cm^2$ (30.4 to 60,000 psia), with the contact angle of mercury being 140° and surface tension being 480 dyne/cm.

In the present invention, both the nitrogen adsorption method and mercury intrusion porosimetry method are used to determine pore volume for the following reasons: The former method can only determine pore volume of pores with a relatively small pore diameter of approximately 60 nm or less because the amount of nitrogen adsorbed on the pore walls is determined, while the latter method can determine pores with a pore diameter over a wide range of several nm or larger because the volume of mercury packed inside the pores is determined.

ii) Bulk Density of Catalyst

It is preferred that bulk density of the catalyst of the present invention be 0.52 $cm^3/g$ or less, particularly 0.40 to 0.52 $cm^3/g$, and more particularly 0.42 to 0.52 $cm^3/g$. If the bulk density exceeds 0.52 $cm^3/g$, there will be a relative reduction in demetallizing performance. Bulk density of the catalyst carrier used to obtain the catalyst of the present invention is preferably 0.50 $cm^3/g$ or less, and more preferably 0.35 to 0.50 $cm^3/g$. Bulk density can be found from apparent volume after packing a catalyst or carrier in a 100 $cm^3$ graduated cylinder and shaking 100 times.

iii) Refractory Porous Carrier

The preferred carrier of the catalyst of the present invention can be prepared by kneading a porous starting powder whose main component is γ-alumina, pore volume is 0.75 $cm^3/g$ or greater, and mean pore diameter is 10 to 200 μm and then molding and calcining this kneaded product. The γ-alumina carrier is preferably contained in the catalyst in 70 wt % or more, particularly 80 wt % or more catalyst weight. This catalyst can comprise silica-alumina, zeolite, boria, titania, zirconia, magnesia and other compound oxides in addition to the γ-alumina. γ-alumina is used as the main component because high activity is produced from the catalyst with a carrier made of γ-alumina.

The porous starting powder used to produce the carrier preferably has γ-alumina as the main component, a pore volume of 0.75 $cm^3/g$ or greater, particularly 0.9 to 1.3 $cm^3/g$, and a mean particle diameter of 10 to 200 μm, particularly 10 to 150 μm, more particularly 30 to 150 μm. The value of pore volume used here can be determined as the value of volume to which the amount of nitrogen gas adsorbed under conditions of a relative pressure of 0.967 during desorption of nitrogen gas is converted as liquid. The mean particle diameter used here can be determined as the median diameter of particle diameter distribution as determined by the wet laser light scattering method.

When a starting powder with a pore volume under 0.75 $cm^3/g$ or a mean particle diameter under 10 μm is used, plasticity of the kneaded product will be poor, and when this is molded, defects will be made in the structure of the molded article and abrasion resistance of the catalyst will drop. When this type of catalyst is packed in a reaction vessel, it will form a powder when it is packed and the voids in the catalyst will be buried, leading to an increase in differential pressure. If a starting powder whose mean particle diameter exceeds 200 μm is used, rupture strength of the catalyst will become weaker and once it is packed in the reaction vessel it will rupture under the load of the catalyst itself.

This starting powder can comprise silica-alumina, zeolite, boria, titanium, zirconia, magnesia or other compound oxides, but it is preferred that 70% or more, particularly 80% or more, of the starting powder in terms of the weight of the carrier be γ-alumina. It is preferred that the median particle diameter of pore distribution with a pore diameter of 2 to 60 nm is 8 to 15 nm and the specific surface area is 230 to 330 m$^2$/g in order to obtain high catalytic activity. It is preferred that the γ-alumina that is the main component of the starting powder be pseudoboehmite powder that has been calcined at 450 to 460° C.

iv) Kneading

Kneading can be performed by a kneading device that is generally used in catalyst preparation. As a preferred method, water is added to the above-mentioned powder and then mixed with mixing blades. Water is usually added during kneading, but an alcohol or ketone may also be used. Moreover, an acid such as nitric acid, acetic acid, formic acid, etc., a base such as ammonia, etc., organic compounds, surfactants, active components, etc., may also be used. It is particularly preferred that a binder component consisting of an organic compound such as water-soluble cellulose acetate, etc., be added at 0.2 to 5 wt % per starting powder. The kneading time and kneading temperature can be selected as needed, but it is preferred that kneading be performed until height (hereinafter referred to as PF value) goes from 15 mm to 25 mm when the kneaded product is made into a cylindrical sample with a diameter of 33 mm and height of 40 mm and is then deformed by dropping a disk weighing 1,192 g (diameter of 120 mm, height of 7.5 mm) onto the cylindrical sample from a height of 186 mm from the base of the sample (Pfefferkorn plasticity tester; Ceramic Production Process: Powder Preparation and Molding, Ceramic Society of Japan Editorial Committee Lecture Subcomittee, editors, Ceramic Society of Japan, 1984).

v) Molding and Calcining

Molding can be easily performed to pellet-shaped, honeycomb-shaped, etc., using a device such as a plunger-type extruder, screw-type extruder, etc. A plunger-type extruder is ideal for the present invention. A molded article in the shape of a cylinder, hollow cylinder, column whose cross section has 3 or 4 lobes, etc., with a diameter of usually 0.5 to 6 mm, particularly 0.5 to 5 mm, is used. After molding, it is preferred that the molded article be dried at normal temperature to 150° C., particularly 100 to 140° C., an and then calcined at 350 to 900° C. for 0.5 hour or longer, particularly 500 to 850° C. for 0.5 to 5 hours.

vi) Hydrogenation Active Metal Component

One or a combination of 2 or more from among elements of Group 6, Group 8, Group 9 and Group 10 of the Periodic Table, particularly molybdenum, tungsten, nickel and cobalt, is preferable as the hydrogenation active metal component. It is preferred that these elements be contained in the catalyst in the form of a metal, oxide, or sulfide. The content of these elements in the entire catalyst should be within a range of 0.1 wt % to 20 wt %, particularly a range of 1 wt % to 10 wt %, as the total metal weight.

The support method, blending method, etc., can be used as the method by which the hydrogenation active component is contained in the catalyst. Demetallizing activity can be raised when at least one hydrogenation active metal component is added by blending. The blending method can be the method whereby the hydrogenation active component is pre-contained in the starting powder or the method whereby the hydrogenation active metal component is kneaded and blended with the starting powder.

Moreover, the hydrogenation active metal component can also be supported on the catalyst carrier, and conventional means of impregnation that are usually used, such as the pore-filling method, the heating impregnation method, the vacuum impregnation method, etc., immersion, etc., can be used as the support method. Once the metal component has been supported, it is preferred that the product be dried for 10 minutes to 24 hours at a temperature of 80 to 200° C., and calcined for 15 minutes to 10 hours at a temperature of 400 to 600° C., particularly 450 to 550° C.

vii) Other Active Components

It is preferred that 0.1 wt % to 20 wt %, particularly 0.2 wt % to 5 wt %, more particularly, 0.5 wt % to 1.5 wt %, oxide of phosphorus and/or boron be added to the catalyst of the present invention in terms of element weight. As a result, demetallizing activity will be improved.

viii) Subjects of Hydrorefining

The catalyst of the present invention is ideal for use on heavy oil comprising fractions with a boiling point of 350° C. or higher, that is, various heavy fractions and residue obtained by normal-pressure distillation or reduced-pressure distillation of crude oil, tar sand, shale oil, petroleum liquefaction oil, etc., and heavy oil obtained by their cracking, isomerization, modification, solvent extraction, etc. It is particularly ideal for treatment of heavy oils with a high metal content, such as reduced-pressure residue, normal-pressure residue, etc., in the concrete, heavy oil containing nickel or vanadium, etc., as the metal component at 45 ppm by weight or more, particularly 50 ppm by weight or more, further, 60 ppm by weight or more, in terms of metal weight. In addition, the catalyst of the present invention is ideal for treatment of heavy oil containing 3% or more asphaltene component. A typical method of determining the asphaltene content is provided in Code of the U.S. Bureau of Mines (Anal. Chem., vol. 20, p 460~, (1968)).

ix) Hydrogenation Conditions

Preferable conditions for hydrorefining heavy oil using the catalyst of the present invention are a reaction temperature of 300 to 450° C., a hydrogen partial pressure of 30 to 250 kg/cm$^2$, a liquid space velocity of 0.1 to 10 hr$^{-1}$, a hydrogen:heavy oil ratio of 100 to 4,000 L/L, and more preferably, a reaction temperature of 350 to 420° C., a hydrogen partial pressure of 80 to 200 kg/cm$^2$, a liquid space velocity of 0.15 to 1.0 hr$^{-1}$, and a hydrogen:heavy oil ratio of 500 to 1,000 L/L.

Crude oil demetallizing activity tests using the hydrorefining catalyst and method of producing a hydrorefining catalyst of the present invention will now be explained specifically using examples and comparative examples.

(1) Preparation of Catalyst

EXAMPLE 1

Preparation of Catalyst 3056

Powder G consisting of γ-alumina was made by calcining powder A consisting of commercial pseudoboehmite at 600° C. Properties of this powder G were a mean particle diameter of 101 μm, a specific surface area of 268 m$^2$/g, a pore volume of 1.01 cm$^3$/g, and a median pore diameter of 12 nm. The pore properties shown here were determined using the model ASAP 2400 determination device of Micromeritics. Mean particle diameter was determined by the wet method using the Microtrac Particle Diameter Analyzer of Nikkiso Co., Ltd. This analyzer analyzes particle diameter from forward scattering of light when a sample is dispersed in water and irradiated with light.

Then 2,058 g ion-exchanged water and 15 g water-soluble cellulose ether were added to 1,500 g powder G that was obtained and kneaded. Using a screw-type extrusion molding device, the kneaded product was extruded from a round opening with a diameter of 1.6 mm to make a cylindrical molded article. This molded product was dried for 15 hours at 130° C. using a dryer and then calcined for 1 hour at 800° C. under an air current to make the carrier.

This carrier was impregnated with a liquid for supporting active component consisting of aqueous ammonium molybdate solution by the spray method. After drying for 20 hours at 130° C., the product was again impregnated with a liquid for supporting active component consisting of aqueous nickel nitrate solution by the spray method and dried for 20 hours at 130° C. and calcined for 25 minutes at 450° C. under an air current to prepare catalyst 3056 containing 3.0 wt % molybdenum and 1.0 wt % nickel.

EXAMPLE 2

Preparation of Catalyst 3066

First, 2,177 g ion-exchanged water and 15 g water-soluble cellulose ether were added to 1,500 g powder G prepared in Example 1 and kneaded. This was kneaded until the PF value became 20 mm. Then the product was molded using a plunger-type extrusion molding device and calcined under the same conditions as in Example 1 to obtain the carrier. The carrier that was obtained was impregnated with liquid for supporting active component consisting of an aqueous solution of ammonium molybdate, nickel nitrate and phosphoric acid by the spray method. The product was dried for 20 hours at 130° C. and calcined for 25 minutes at 450° C. under an air current to prepare catalyst 3066 containing 3.0 wt % molybdenum, 1.0 wt % nickel and 0.6 wt % phosphorus.

EXAMPLE 3

Preparation of Catalyst 3070

A carrier prepared as in Example 1 was impregnated with liquid for supporting active component consisting of an aqueous solution of ammonium molybdate and boric acid by the spray method and dried for 20 hours at 130° C. It was then re-impregnated with a liquid for supporting active component consisting of aqueous nickel nitrate solution by the spray method, dried for 20 hours at 130° C., and then calcined for 25 minutes at 450° C. under an air current to prepare catalyst 3070 containing 3.0 wt % molybdenum, 1.0 wt % nickel and 1.0 wt % boron.

EXAMPLE 4

Preparation of Catalyst 3057

First, 2,062 g aqueous ammonium molybdate solution and 7 g water-soluble cellulose ether were added to 1,500 g powder G and kneaded. Then the kneaded product was extruded from a round opening with a diameter of 1.6 mm using a screw-type extrusion molding device to make a cylindrical molded product. This molded product was dried for 15 hours at 130° C. using a dryer and calcined for 1 hour at 600° C. under an air current to obtain a catalyst.

This carrier was impregnated with liquid for supporting active component consisting of an aqueous nickel nitrate solution by the spray method. The product was dried for 20 hours at 130° C. and calcined for 25 minutes at 450° C. under an air current to prepare catalyst 3057 containing 3.0 wt % molybdenum and 1.0 wt % nickel.

EXAMPLE 5

Preparation of Catalyst 3058

Other than the fact that a carrier was obtained by calcining the molded product after drying for 1 hour at 800° C. under an air current, a catalyst was prepared as in Example 4 to obtain catalyst 3058 containing 3.0 wt % molybdenum and 1.0 wt % nickel.

EXAMPLE 6

Preparation of Catalyst 3009

Powder B consisting of commercial pseudoboehmite was calcined at 600° C. to make powder H consisting of γ-alumina. The properties of this powder H were a mean particle diameter of 12 μm, specific surface area of 236 m²/g, pore volume of 0.82 cm³/g, and median pore diameter of 12 nm. Then 1,627 g ion-exchanged water were added to 1,137 g powder H and 363 g powder E consisting of pseudoboehmite and kneading was performed. The kneaded product was extruded from a round opening with a diameter of 1.6 mm using a screw-type extrusion molding device to obtain a cylindrical molded product. This molded product was dried for 15 hours at 130° C. using a dryer and calcined for 1 hour at 600° C. under an air current to obtain a carrier.

This carrier was used to prepare a catalyst as in Example 1. Catalyst 3009 containing 3.0 wt % molybdenum and 1.0 wt % nickel was obtained.

EXAMPLE 7

Preparation of Catalyst 3032

Other than the fact the molded product after drying was calcined for 1 hour at 800° C. under an air current, a carrier was prepared as in Example 6. The carrier that was obtained was used to prepare a catalyst as in Example 2 (catalyst 3066). Catalyst 3032 containing 3.0 wt % molybdenum, 1.0 wt % nickel, and 1.0 wt % phosphorus was obtained.

EXAMPLE 8

Preparation of Catalyst 3076

Other than the fact that a kneaded product that had been kneaded to a PF value of 19 mm was extruded from a round opening with a diameter of 1.3 mm, a catalyst was prepared as in Example 2 (catalyst 3066). Catalyst 3076 containing 3.0 wt % molybdenum, 1.0 wt % nickel and 0.6 wt % phosphorus was obtained.

EXAMPLE 9

Preparation of Catalyst 3087

Other than the fact that a kneaded product that had been kneaded to a PF value of 16 mm was extruded from a 4-lobe opening with a diameter of 1.7 mm, a catalyst was prepared as in Example 2 (catalyst 3066). Catalyst 3087 containing 3.0 wt % molybdenum, 1.0 wt % nickel and 0.6 wt % phosphorus, if respectively, was obtained.

COMPARATIVE EXAMPLE 1

Preparation of Catalyst 3043

Powder C consisting of commercial pseudoboehmite was calcined at 600° C. to prepare powder I consisting of γ-alumina. Properties of powder I were a mean particle diameter of 17 μm, specific surface area of 256 m²/g, pore volume of 0.70 cm³/g, and median pore diameter of 10 nm.

Other than the fact that a carrier was obtained by calcining powder I for 1 hour at 600° C. under an air current, a catalyst was prepared as in Example 1 (Catalyst 3056). Catalyst 3043 containing 3.0 wt % molybdenum and 1.0 wt % nickel was obtained.

COMPARATIVE EXAMPLE 2

Preparation of Catalyst 3010

First, 1,589 g ion-exchanged water were added to 805 g powder H and 695 g powder E used in Example 6 and the mixture was kneaded. Then a catalyst was prepared as in Example 6 (Catalyst 3009). Catalyst 3010 containing 3.0 wt % molybdenum and 1.0 wt % nickel was obtained.

COMPARATIVE EXAMPLE 3

Preparation of Catalyst 3093

First, 2,068 g ion-exchanged water and 15 g water-soluble cellulose ether were added to 1,500 g powder G and [the product] was kneaded to a PF of 25 mm. Next, a catalyst was prepared as in Example 2 (Catalyst 3066). Catalyst 3093 containing 3.0 wt % molybdenum, 1.0 wt % nickel, and 0.6 wt % phosphorus was obtained.

COMPARATIVE EXAMPLE 4

Preparation of Catalyst 3041

First, 431 g ion-exchanged water, 1,000 g aqueous nitric acid solution, and 255 g aqueous polyvinyl alcohol solution were added to 1,456 g of powder I and 44 g of powder consisting of commercial pseudoboehmite and the mixture was kneaded. Then a catalyst was prepared as in Comparative Example 1 (Catalyst 3043). Catalyst 3041 containing 3.0 wt % molybdenum and 1.0 wt % nickel were obtained.

COMPARATIVE EXAMPLE 5

Preparation of Catalyst 3021

Powder D consisting of commercial pseudoboehmite was calcined at 600° C. to prepare powder J consisting of γ-alumina. The properties of this powder J were a mean particle diameter of 66 μm, specific surface area of 299 m²/g, pore volume of 0.92 cm³/g, and median pore diameter of 11 nm.

Then 854 g ion-exchanged water and 752 g aqueous nitric acid solution were added to 1,500 g powder J and kneading was performed. Next, other than the fact that molding was performed using a plunger-type extrusion molding device, a catalyst was prepared as in Comparative Example 1 (Catalyst 3043). Catalyst 3021 containing 3.0 wt % molybdenum and 1.0 wt % nickel were obtained.

COMPARATIVE EXAMPLE 6

Preparation of Catalyst 3023

First, 1,381 g ion-exchanged water were added to 1,162 g powder J and 338 g powder E and kneading was performed. Then a catalyst was prepared as in Comparative Example 1 (Catalyst 3043). Catalyst 3023 containing 3.0 wt % molybdenum and 1.0 wt % nickel was obtained.

COMPARATIVE EXAMPLE 7

Preparation of Catalyst 3025

First, 792 g ion-exchanged water and 753 g aqueous nitric acid solution were added to 1,500 g powder J and kneading was performed. Next, other than the fact that molding was performed using a plunger-type extrusion molding device, a catalyst was prepared as in Example 1 (catalyst 3056). Catalyst 3025 containing 6.0 wt % molybdenum and 1.5 wt % nickel was obtained.

COMPARATIVE EXAMPLE 8

Catalyst HOP606

Commercial bimodal catalyst HOP606 (produced by Orient Catalyst) was used.

COMPARATIVE EXAMPLE 9

Preparation of Catalyst 3069

Other than the fact that powder I was used in place of powder G, a catalyst was prepared as in Example 2 (catalyst 3066). Catalyst 3069 containing 3.0 wt % molybdenum, 1.0 wt % nickel and 0.6 wt % phosphorus each was obtained.

(2) Property Evaluation of Catalysts

Specific surface area, pore volume and median pore diameter of the catalysts that were prepared in the above-mentioned examples and comparative examples were determined by the above-mentioned nitrogen adsorption method. The determination results are shown in Table 1-A in FIG. 1. Moreover, the pore volume of these catalysts was determined using the above-mentioned mercury intrusion porosimetry method. The pore volume of pores with a pore diameter of 50 nm or larger and the pore volume of pores with a pore diameter of 1,000 nm or larger were also determined using the mercury intrusion porosimetry method. The results of determining these pore volumes by the mercury intrusion porosimetry method are shown in Table 1-B in FIG. 2.

Table 1-A also shows the shape and dimensions of the above-mentioned catalysts and the weight ratio of γ-alumina to supported active component and carrier weight. Moreover, the results of determining the bulk density of the catalysts are shown in Table 1-B. Bulk density was determined using a determination device having a cylinder with an inner diameter of 28 mm and determination capacity of 100 cm³ (SEISIN TAPDENSER KYT-3000). Furthermore, the type of extruder used in molding is shown in Table 1-B by S (screw-type extruder) or P (plunger-type extruder).

Based on the results in Tables 1-A and 1-B, it is clear that pore volume by the nitrogen adsorption method is 0.59 cm³/g or greater and median pore diameter is 8.2 nm or larger, while pore volume by the mercury intrusion porosimetry method is 0.88 cm³/g or greater and pore volume of pores with a pore diameter of 50 nm or larger determined by the mercury intrusion porosimetry method is 0.33 cm³/g or greater.

(3) Evaluation of Demetallizing Activity of Catalyst

In order to evaluate demetallizing activity of the catalysts that were produced in above-mentioned examples and comparative examples, a hydrodemetallization reaction was performed under the operating conditions in the following Table 3 using Boscan crude oil and Ratawi residue with the properties shown in the following Table 2 as the starting oil.

The Ratawi residue is a mixed oil of 50% normal-pressure residue and 50% reduced-pressure residue of Ratawi crude oil.

TABLE 2

| Boscan crude oil properties | Ratawi residue properties |
| --- | --- |
| Bulk density: 0.998 g/cm$^3$ | 1.03 g/cm$^3$ |
| Sulfur content: 4.98 wt % | 5.71 wt % |
| Vanadium content: 1,197 ppm by weight | 136 ppm by weight |
| Nickel content: 119 ppm by weight | 51 ppm by weight |
| Asphaltene content: 10.6 wt % | 11.8 wt % |

TABLE 3

| Operating conditions of hydrodemetallization reaction | |
| --- | --- |
| Amount of catalyst packed in reaction vessel: | 100 cm$^3$ |
| Catalytic reaction vessel: | diameter of 2.5 cm length of 100 cm |
| Sulfurization method: | dissolution of 1 wt % carbon sulfide in gas oil |
| H$_2$ purity: | 99.9% or higher |
| H$_2$ pressure: | 140 kgf/cm$^2$ |
| Liquid space velocity: | 1.0 hr$^{-1}$ |
| Hydrogen/oil ratio: | 670 L/L |

Using each catalyst that had been sulfurized, reaction temperature was raised from 380° C. to 385 and 390° C. under the catalyst reaction conditions in Table 3 and hydrorefining was performed using Ratawi residue as the starting oil. Then the vanadium and nickel concentrations of the-refined oil were determined. The primary demetallization reaction speed constant at 390° C. was found from the vanadium and nickel concentrations that were determined. These values are shown in Table 1-B as the initial demetallizing activity.

The increase in the amount of vanadium and nickel metals deposited on the catalyst and change in the demetallizing rate were found by switching the starting oil to Boscan crude oil and continuing hydrorefining at a reaction temperature of 390° C. with the catalysts obtained in Examples 2, 6, 7, 8, and 9 and Comparative Examples 3, 7, and 8. The results are shown in FIG. 3. The axis of ordinates in FIG. 3 shows the demetallizing rate and the axis of abscissas shows the amount of metal (g) deposited on 100 g of fresh catalyst.

As is clear from FIG. 3, the demetallizing rate with initial use was approximately the same with all of the catalysts excluding HOP606, but there was a sudden reduction in the demetallizing rate with an increase in the amount of metal deposition and catalyst activity was lost with catalysts 3025 (Comparative Example 7) and 3093 (Comparative Example 3). In contrast to these Comparative Examples, it is clear that the catalysts in the examples retain their relatively high demetallizing activity even when the amount of nickel deposition increases.

The effective amount of metal deposition was defined as shown below as a criterion for evaluating the amount of metal deposition from demetallization. The effective amount of metal deposition is defined by the total weight of vanadium and nickel deposited on the catalyst per 100 g catalyst weight packed in the vessel up to the time when the demetallizing rate dropped to 50% as a result of performing a reaction under conditions of a reaction temperature of 390° C., a hydrogen pressure of 140 kg/cm$^2$G, a liquid space velocity of 1.0 hr$^{-1}$, and a hydrogen oil ratio of 670 NL/NL with Boscan crude oil, which has an extremely high vanadium and nickel content. The weight of vanadium and nickel that have accumulated on the catalyst is found by estimating the difference in the vanadium and nickel concentrations between the starting oil and the refined oil over time. The value of the effective amount of metal deposition of the catalysts obtained in Examples 2, 6, 7, 8 and 9 and Comparative Examples 3, 7, and 8 are shown in FIG. 3 and Table 1-B. Life of the catalyst can be evaluated from the value of the effective amount of metal deposition. That is, when compared to the catalysts of the Comparative Examples, the catalysts in the Examples are capable of long-term retention of good demetallizing activity, even if vanadium and nickel are deposited in the catalyst holes.

Table 1-B shows the overall evaluation based on initial demetallizing activity and the effective amount of metal deposition. In the evaluation, an O means that both are high, while an X means that either is low.

From the above-mentioned it is clear that the hydrorefining catalysts according to the present invention are superior when compared to conventional hydrorefining catalysts in terms of both demetallizing activity and the effective amount of metal deposition.

The starting oil was temporarily switched for Ratawi residue when the increase in the amount of metal deposition and changes in the demetallizing rate were being found with Boscan crude oil in Examples 6 and Comparative Example 8 and changes in the deasphaltening rate were found. The results are shown in FIG. 4. The axis of abscissas in FIG. 4 shows the deasphaltening percentage and the axis of abscissas shows the amount of metal (g) deposited by 100 g fresh catalyst.

It is clear from FIG. 4 that the catalysts of the examples retain a high deasphaltening activity even when the amount of metal deposition increases.

(4) Evaluation of Wear Rate of Catalysts

The wear rate of the catalysts in Example 2 and Comparative Examples 3 and 9 was found by standard testing methods (ASTM D4058-92). The results are shown in Table 1-B. Catalysts that used a powder with a pore volume of 0.75 cm$^3$/g or more clearly showed a low wear rate and no increase in differential pressure of the hydrorefining reaction vessel.

Industrial Applicability

The hydrorefining catalyst of the present invention is ideal for demetallization treatment of heavy oil comprising large amounts of metal components such as nickel and vanadium, including reduced-pressure residue, normal-pressure residue, etc., because it has a high demetallizing activity and a high effective amount of metal deposition. Moreover, it is also ideal for treatment of heavy oil comprising 3% or more asphaltene component. By using the method of producing a hydrorefining catalyst of the present invention it is possible to easily produce a hydrorefining catalyst with an excellent demetallizing activity and effective amount of metal deposition at a low cost.

What is claimed is:

1. A hydrorefining catalyst comprising a hydrogenation active metal component supported on a refractory porous carrier, wherein a median pore diameter determined by the nitrogen adsorption method is 8 to 20 nm, a pore volume determined by the nitrogen adsorption method is 0.56–1.0 cm$^3$/g, and a pore volume of pores having a pore diameter 50 nm or larger determined by the mercury intrusion porosimetry method is 0.32–1.1 cm$^3$/g, wherein the pore volume of all pores determined by the mercury intrusion porosimetry method is 0.87 cm$^3$/g or greater.

2. A hydrorefining catalyst according to claim 1, therein the catalyst is used in demetallizing or deasphaltening of heavy oil.

3. A hydrorefining catalyst according to claim 1, wherein a pore volume of pores with a pore diameter of not less than 1,000 nm measured by the mercury intrusion porosimetry method is not more than 0.2 cm$^3$/g.

4. A hydrorefining catalyst according to claim 1, wherein the catalyst has a bulk density of 0.52 g/cm$^3$ or less.

5. A hydrorefining catalyst according to claim 1, wherein the catalyst comprises 2 to 6 wt % molybdenum and 0.5 to 2 wt % nickel or cobalt as the hydrogenation active metal component.

6. A hydrorefining catalyst according to claim 1, wherein the catalyst comprises 0.5 to 1.5 wt % phosphorus or boron.

7. A hydrorefining catalyst according to claim 1, wherein the catalyst is molded by extrusion molding.

8. A hydrorefining catalyst according to claim 1, wherein the catalyst exhibits an effective amount of metal deposition that is 70 g or more per 100 g of fresh catalyst.

9. A hydrorefining catalyst according to claim 1, wherein the catalyst is used for demetallization treatment of heavy oil containing 45 ppm by weight or more of nickel or vanadium with respect to metal weight.

10. A hydrorefining catalyst according to claim 1, wherein the catalyst is used for deasphaltening treatment of heavy oil containing 3% or more asphaltene component.

11. A method of producing a hydrorefining catalyst comprising a hydrogenation active metal, comprising the steps of:

kneading a porous starting powder whose main component is crystalline γ-alumina wherein the crystalline γ-alumina in the porous starting powder is present at 90 weight t or more and wherein the crystalline γ-alumina has a pore volume of 0.75 cm$^3$/g or greater and a mean particle diameter of 10 to 200 μm to prepare a kneaded product;

molding and calcining said kneaded product; and supporting the active metal component on the kneaded product or on the kneaded product after calcining.

12. A method of producing a hydrorefining catalyst according to claim 11, wherein the crystalline γ-alumina is crystalline γ-alumina that has been obtained by calcining boehmite powder.

13. A method of producing a hydrorefining catalyst according to claim 12, wherein the molding is performed by extrusion molding.

\* \* \* \* \*